United States Patent
Magnezi et al.

(10) Patent No.: US 9,606,793 B1
(45) Date of Patent: Mar. 28, 2017

(54) BACKPORTING OF BUG PATCHES

(71) Applicant: Red Hat Israel, Ltd., Raanana (IL)

(72) Inventors: Nir Magnezi, Petah Tikva (IL); Michael Kolesnik, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/265,623

(22) Filed: Sep. 14, 2016

(51) Int. Cl.
*G06F 9/44* (2006.01)
*G06F 11/36* (2006.01)

(52) U.S. Cl.
CPC .................. *G06F 8/71* (2013.01); *G06F 8/75* (2013.01); *G06F 11/3668* (2013.01)

(58) Field of Classification Search
None
See application file for complete search history.

(56) References Cited

U.S. PATENT DOCUMENTS

| 7,146,608 | B1 | 12/2006 | Newman et al. | |
|---|---|---|---|---|
| 7,614,043 | B2 | 11/2009 | Ognev et al. | |
| 8,856,169 | B2 | 10/2014 | Zhang et al. | |
| 8,875,120 | B2 * | 10/2014 | Venkatesan | G06F 8/65 717/172 |
| 2004/0031027 | A1 | 2/2004 | Hiltgen | |
| 2006/0048130 | A1 * | 3/2006 | Napier | G06F 8/65 717/168 |
| 2006/0288055 | A1 | 12/2006 | Johnson et al. | |
| 2008/0295085 | A1 * | 11/2008 | Rachamadugu | G06F 8/75 717/159 |
| 2009/0187823 | A1 * | 7/2009 | Farrell | G06F 8/71 715/700 |
| 2012/0246618 | A1 * | 9/2012 | Schatz | G06F 8/71 717/122 |
| 2015/0169431 | A1 * | 6/2015 | Ivankovic | G06F 11/3676 717/124 |
| 2016/0246699 | A1 * | 8/2016 | Edri | G06F 8/68 |

OTHER PUBLICATIONS

"Backporting Fixes and Shuffling Branches", retrieved from http://aras-p.info/blog/2016/04/07/backporting-fixes-and-shuffling-branches/ on Oct. 31, 2016.*
Dague, S. "Procedure for back-porting a bug fix to stable/liberty branch of a Neutron script in DevStack?" OpenStack, Open Source Cloud Computer Software, Jan 3, 2016, 3 pages, downloaded from http://lists.openstack.org/pipermail/openstack-dev/2016-January/083279.html on May 23, 2016.

(Continued)

*Primary Examiner* — Philip Wang
(74) *Attorney, Agent, or Firm* — Lowenstein Sandler LLP (57) ABSTRACT

A system and method to facilitate backporting of bug patches to earlier versions of a project are disclosed. In one implementation, an indication that an error has been fixed for a version of a project managed by a code review system is received. An indication that a patch for the error has been applied to the earlier version of the project is received from the code review system. A message is sent to at least one participant of the project identifying the patch and the earlier version of the project, and indicating that the patch has been successfully applied to the earlier version of the project.

20 Claims, 6 Drawing Sheets

(56) References Cited

OTHER PUBLICATIONS

"Backporting fixes", MediaWiki.org, last modified Jan. 6, 2016, 2 pages, downloaded from https://www.mediawiki.org/wiki/Backporting_fixes on May 23, 2016.

Spiers, Adam, "Structured Procrastination—Easier upstreaming / back-porting of patch series with git", Sep. 19, 2013, 14 pages, downloaded from http://blog.adamspiers.org/2013/09/19/easier-upstreaming-with-git/ on May 23, 2016.

"How to back port a feature branch after merging?" StackOverflow.com, last edited Dec. 5, 2014, 2 pages, downloaded from http://stackoverflow.com/questions/27024542/how-to-back-port-a-feature-branch-after-merging on May 30, 2016.

"Stable Branches," Openstack.org; 4 pages, downloaded from http://docs.openstack.org/project-team-guide/stable-branches.html on Sep. 23, 2016.

\* cited by examiner

BACKPORTING OF BUG PATCHES

TECHNICAL FIELD

The present disclosure is generally related to computer systems, and more particularly, managing projects using code review systems.

BACKGROUND

A code review system enables participants of a project (e.g., a maintainer of a project, a developer, a testing engineer, etc.) to discuss changes, share knowledge, identify errors (bugs) in the project's code, track code activity, and generate code status reports. Available code review systems include GitLab, Crucible, Reitveld, Gerrit, and Phabricator.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Projects may evolve over time to provide new features, improve functionality, and fix errors (bugs) in a project's code. Successive versions of a project may be established and identified by version numbers (e.g., version 1.0, version 1.1, version 2.0, etc.). A version of a project's code may be updated by applying a piece of software known as a patch to the code. In the case where a patch is to fix one or more errors in a project's code, the patch may be referred to as a bug patch.

A project participant who monitors the reporting and fixing of errors in a project's code may identify a bug patch that has been applied to a particular version of the project. The project participant may attempt to backport (port one or more portions of code from a newer version of a system or component to an earlier version of the system/component) the patch to an earlier version of the project. In cases where a patch is to be applied to a portion of code that has changed since the earlier version, determining whether the patch is applicable to the earlier version as-is (e.g. without any modification) may require one or more of the following: an analysis of the operation of the portion of code in the earlier version, an analysis of the operation of the portion of code in the later version, an analysis of possible side-effects resulting from applying the patch to the earlier version, an analysis of the semantics of the portion of code in the earlier version, or an analysis of the semantics of the portion of code in the later version. Moreover, in some cases code differences between project versions may make it impossible to backport the patch to the earlier project version (e.g., the portion of code being patched in the later version may not exist in the earlier version, the portion of code being patched may be in a different object class, a different class method, a different file, etc.).

Described herein are methods and systems that facilitate backporting of bug patches to earlier versions of projects. In one implementation, a processing device receives an indication that an error has been fixed for a version of a project that is managed by a code review system (a system such as GitLab, Crucible, etc. that enables project participants to discuss changes, share knowledge, identify errors in the project's code, track code activity, generate code status reports, etc.). The processing device identifies a patch to fix the error and a query is submitted to the code review system to identify a set of participants associated with the project.

In response to a determination that backporting of the patch to an earlier version of the project does not cause a conflict, a datum is added to the code review system (e.g., a tag applied to the error, a tag applied to the patch, etc.) indicating that the patch is applicable to the earlier version of the project. In one example, the tag may be of the form <version release name>-backport-potential, where the version release name might be a codename such as 'mitaka' or 'liberty' for the OpenStack project. Upon receiving an indication from the code review system that the patch has been applied to the earlier version of the project, a message that identifies the patch and the earlier version and indicates that the patch has been successfully applied to the earlier version is generated and sent to at least one of the project participants.

Accordingly, aspects of the present disclosure are capable of propagating improvements in code quality and reliability to prior versions of projects. This capability is particularly beneficial in instances where field updates of older project versions may be delayed, or when different project versions are deployed simultaneously in different systems. In particular, aspects of the present disclosure enable the fixing of errors in older versions of a project without requiring older versions to be updated to the newest version of a project. Such backporting can improve the operation and reliability of computer systems running older project versions by fixing security vulnerabilities, errors in transaction processing, and so forth. In addition, because bug patches may also contain code revisions to increase efficiency and reduce consumption of resources such as memory or input/output (I/O), backporting can also improve the performance of computer systems running older project versions.

Figure 1:
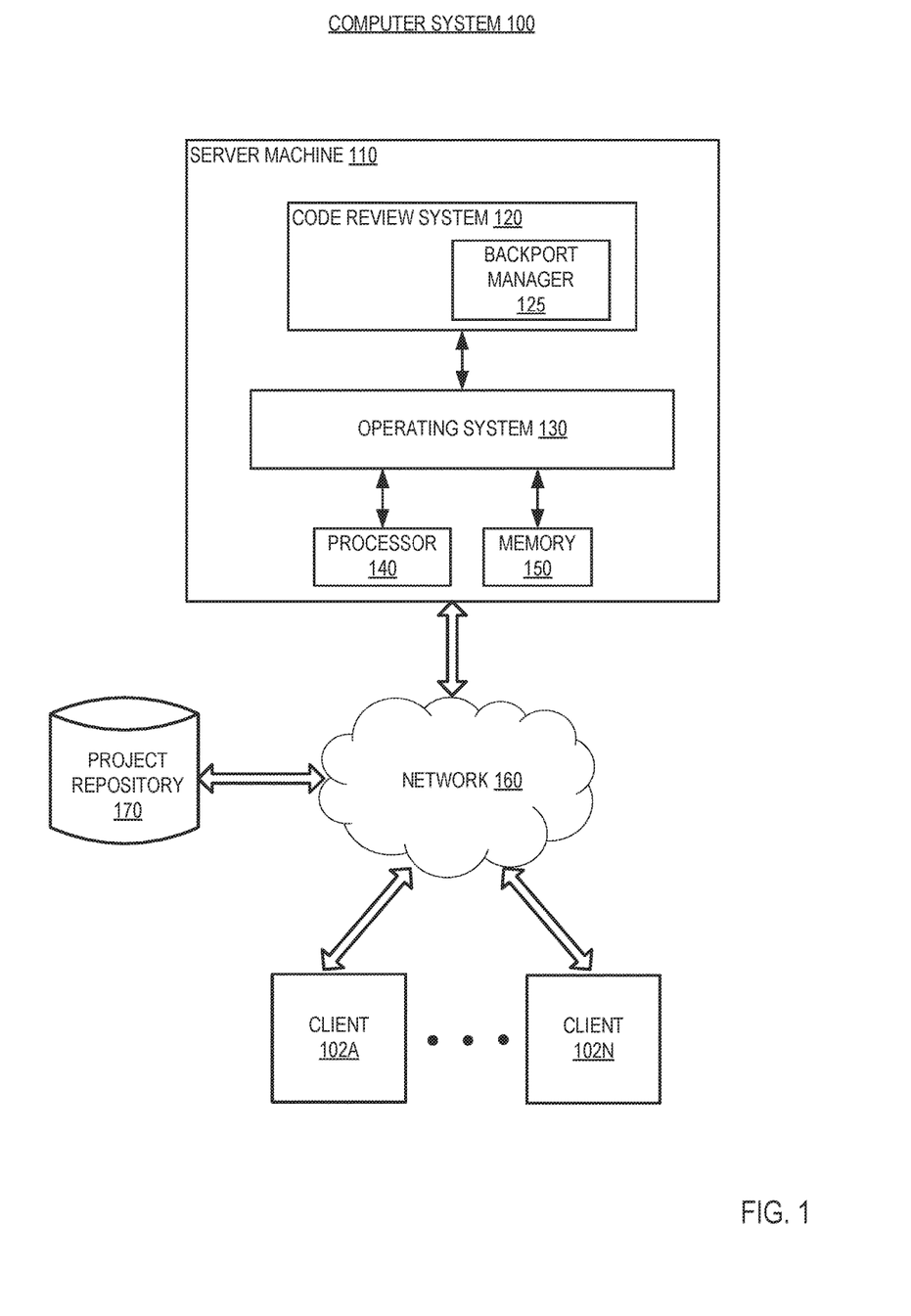
FIG. 1 depicts an illustrative computer system architecture, in accordance with one or more aspects of the present disclosure.

FIG. 1 depicts an illustrative computer system 100, in accordance with one or more aspects of the present disclosure. The computer system 100 includes a server machine 110, a project repository 170, and client machines 102A-102N connected to a network 160. Network 160 may be a public network (e.g., the Internet), a private network (e.g., a local area network (LAN) or wide area network (WAN)), or a combination thereof.

Server machine 110 may be a rackmount server, a router computer, a personal computer, a laptop computer, a tablet computer, or any combination of the above. Server machine 110 includes a processor 140 and a memory device 150. "Memory device" herein refers to a volatile or non-volatile memory device, such as Random Access Memory (RAM), Read-Only Memory (ROM), Electrically Erasable Programmable ROM (EEPROM), or any other device capable of storing data.

"Processor" herein refers to a device capable of executing instructions encoding arithmetic, logical, or I/O operations. In one example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

Server machine 110 includes an operating system (OS) 130 that manages the hardware resources of the server machine and provides functions such as interprocess communication, scheduling, virtual memory management, and so forth. In one aspect, server machine 110 also includes a code review system 120 (e.g., GitLab, Crucible, Reitveld, etc.) that manages projects (e.g., projects stored in project repository 170, etc.) and enables participants of a project (e.g., a maintainer of the project, an author of the patch, a person who discovers the error, etc.) to access and navigate various versions of projects, submit error fixes, check in and check out files, and so forth.

In accordance with one or more aspects of the present disclosure, code review system 120 may include a backport manager component 125 that performs one or more functions of methods 200, 300 and 400 (e.g., determining whether backporting of a patch to an earlier version of the project causes a conflict, sending messages to project participants indicating whether patches can be backported to particular earlier versions of projects, etc.), as described in detail below with respect to FIGS. 2 through 4.

In one example, the project participants may use client machines 102A-102N to access, via network 160, applications and data stored by server machine 110 and project repository 170; transmit data and commands to server machine 110 and project repository 170; and receive data (e.g., responses to queries, messages, project data, etc.) from server machine 110 and project repository 170. The client machines 102A-102N may be personal computers (PC), laptops, mobile phones, tablet computers, or any other computing devices.

Project repository 170 is a persistent storage that is capable of storing data and metadata for multiple versions of multiple projects. In some embodiments, project repository 170 might be a network-attached file server, while in other embodiments project repository 170 might be some other type of persistent storage such as an object-oriented database, a relational database, and so forth, that may be hosted by the server machine 110 or one or more different machines coupled to the server machine 110 via the network 160.

Figure 2:
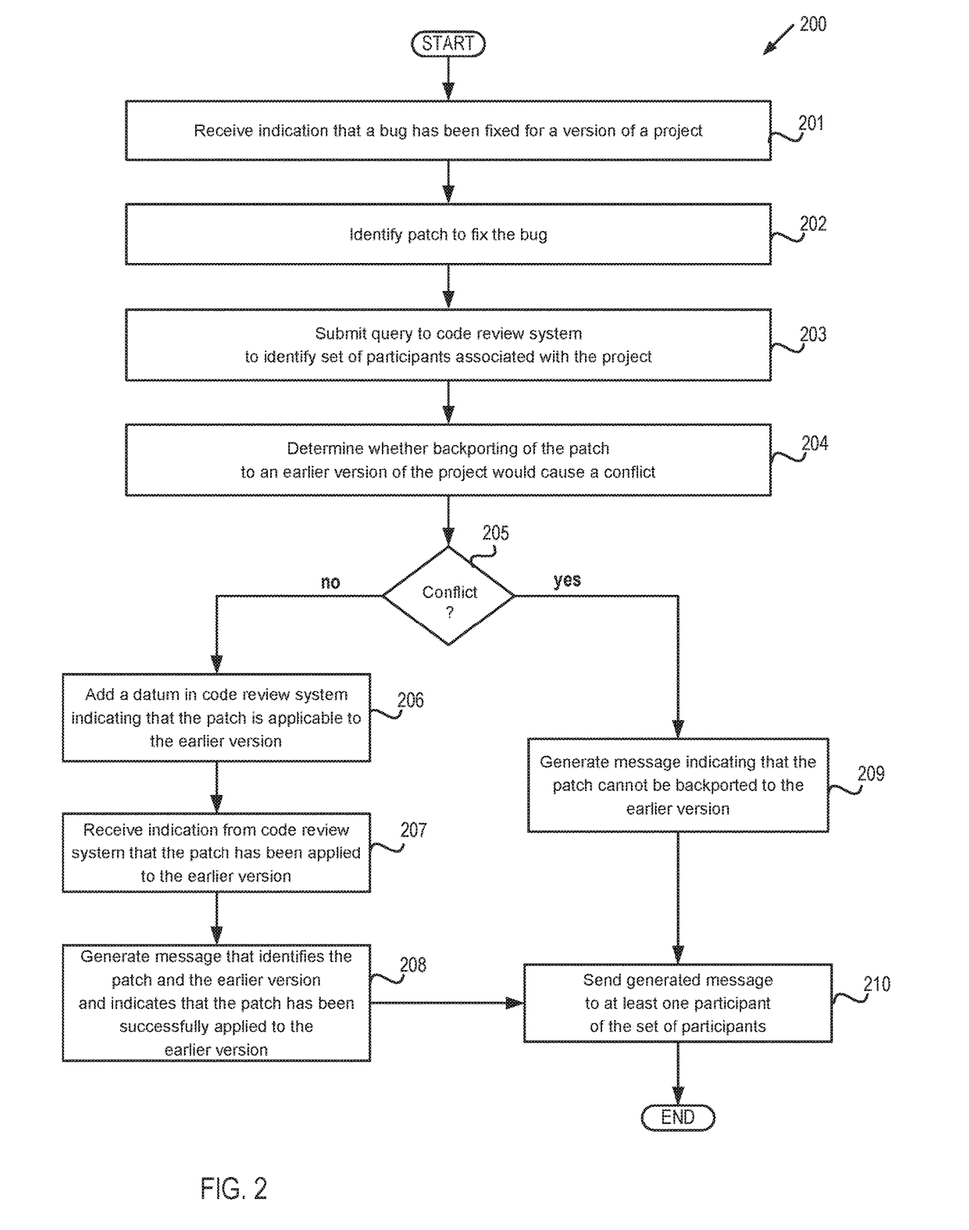
FIG. 2 depicts a flow diagram of one example of a method for backporting bug patches to earlier versions of a project, in accordance with one or more aspects of the present disclosure.

FIG. 2 depicts a flow diagram of one example of a first method 200 for backporting bug patches to earlier versions of a project, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 200 is performed by server machine 110 of FIG. 1, and one or more blocks of the method may be performed by backport manager 125 of code review system 120. It should be noted that in some implementations blocks depicted in FIG. 2 may be performed simultaneously or in a different order than that depicted.

At block 201, an indication is received that an error has been fixed for a version of a project. At block 202, a patch to fix the error is identified. In one implementation, the patch may be identified by submitting a query to code review system 120 and receiving a result of the query from code system 120. In some examples, the query may specify a particular version of the project and request all bug patches for that version, while in some other examples the query may request all bug patches for a plurality of versions of the project, while in some other examples the query may specify a particular code portion of a particular version of a project (e.g., an object class name, a package name, etc.) and request all bug patches for that particular code portion, while in some other examples the query may specify a particular type of bug patch (e.g., critical, non-critical, network related, security related, etc.), and so forth.

At block 203, a query is submitted to code review system 120 to identify a set of participants associated with the project (e.g., a maintainer of the project, an author of the patch, a person who discovers the error, etc.). At block 204, hypothetical backporting of the patch to an earlier version of the project is analyzed to determine whether the backporting causes a conflict. In some examples, the earlier version may be specified by a project participant, while in some other examples, method 200 may be executed iteratively for various earlier versions of the project. For example, for a bug patch for version 2.5 of a project, method 200 might be executed successively for earlier version 2.4, earlier version 2.3, and so forth. In one implementation, various versions of the project are stored project repository 170.

In one implementation, backport manager 125 may determine whether the backporting causes a conflict by determining whether or not the bug patch is applicable to the earlier version. For example, due to code differences between versions of the project, the bug patch may not be able to be applied to the earlier version (e.g., the pertinent code may not exist in the earlier version, or may differ sufficiently from the patched code to preclude backporting to the earlier version, etc.). Thus, to determine whether or not the bug patch is applicable to the earlier version, backport manager 125 may parse the earlier version to identify the pertinent code in the earlier version, determine a measure of similarity between the pertinent code in both versions, compare the measure of similarly to a threshold, etc. to conclude that the patch causes a conflict in the earlier version. In some other implementations, some or all of the conflict detection at block 204 may be performed manually.

At block 205, execution branches based on the determination of block 204. If it was determined at block 204 that backporting of the patch to an earlier version of the project does not cause a conflict, execution proceeds to block 206; otherwise, execution continues at block 209.

At block 206, a datum is added in code review system 120 indicating that the patch is applicable to the earlier version. In some examples, the datum may be a tag applied to the error, while in some other examples, the datum may be a tag applied to the patch. In implementations where the patch comprises a patch file, the tag may be a message embedded within the patch file that indicates that the patch has been committed. It should be noted that in implementations that include a separate bug tracking system in addition to code review system 120, the tag may be added to the bug tracking system instead of, or in addition to, code review system 120.

At block 207, an indication that the patch has been applied to the earlier version is received from code review system 120. In one example, the indication is received by backport manager 125, and may be forwarded from backport manager 125 to one or more of the set of project participants.

At block 208, a message is generated that identifies the patch and the earlier version, and indicates that the patch has been successfully applied to the earlier version. After block 208, execution of method 200 continues at block 210.

At block 209, a message is generated that indicates that the patch cannot be backported to the earlier version. At block 210, the message generated at either block 208 or 209 is sent to at least one participant of the set of participants. In the case where the message was generated at block 209 (i.e., the patch cannot be backported), the message may result in one or more participants of the project attempting to resolve the conflict (e.g., via manual alterations to the patch, by backporting a different patch to the earlier version first, etc.).

Figure 3:
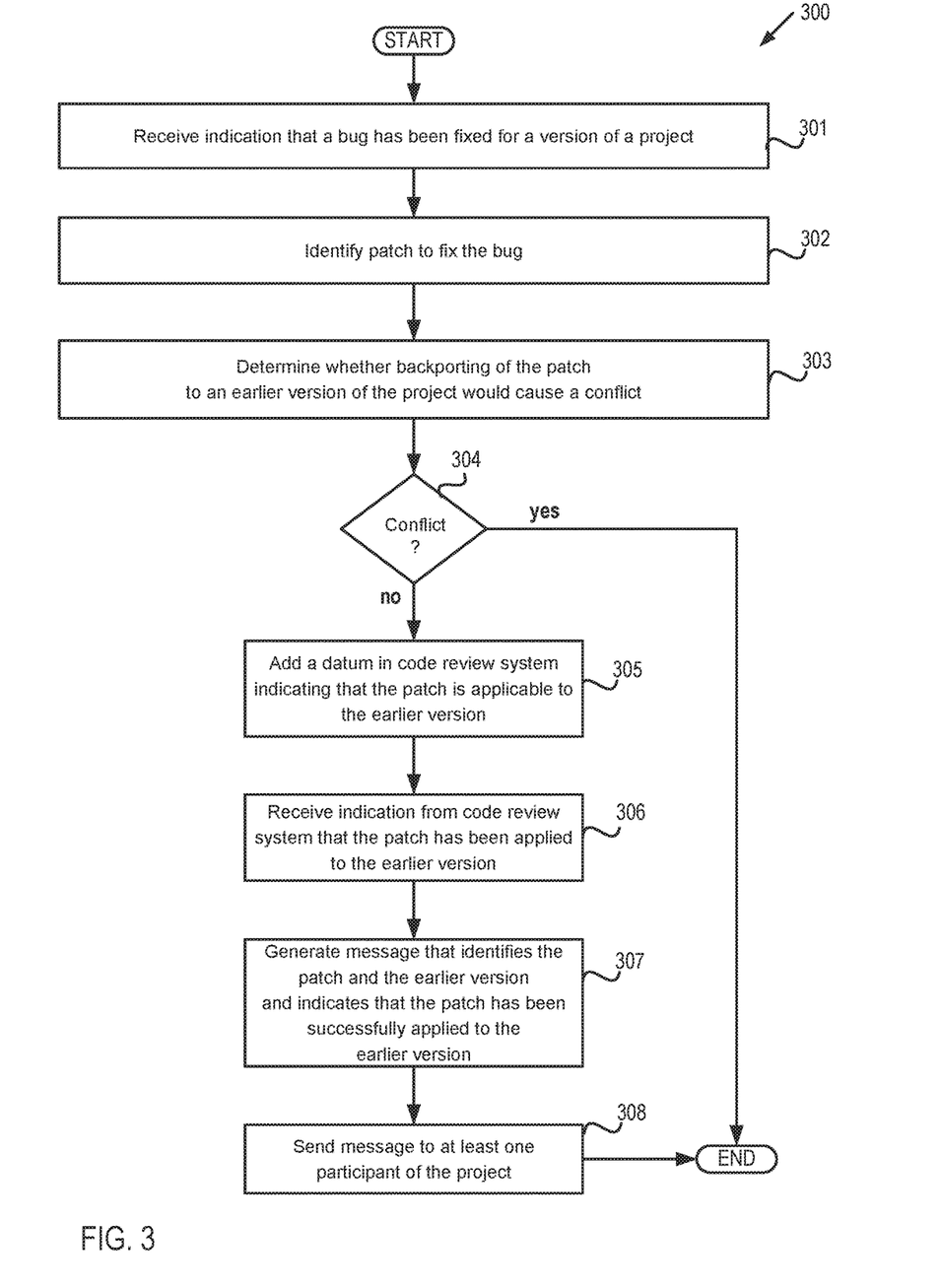
FIG. 3 depicts a flow diagram of another example of a method for backporting bug patches to earlier versions of a project, in accordance with one or more aspects of the present disclosure.

FIG. 3 depicts a flow diagram of another example of a method 300 for backporting bug patches to earlier versions of a project, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 200 is performed by server machine 110 of FIG. 1, and one or more blocks of the method may be performed by backport manager 125 of code review system 120. It should be noted that in some implementations blocks depicted in FIG. 3 may be performed simultaneously or in a different order than that depicted.

At block 301, an indication is received that an error has been fixed for a version of a project, and at block 302, a patch to fix the error is identified, as in blocks 201 and 202 of method 200. At block 303, hypothetical backporting of the patch to an earlier version of the project is analyzed to determine whether the backporting causes a conflict, as in block 204 of method 200.

At block 304, execution branches based on the determination of block 303. If it was determined at block 303 that backporting of the patch to an earlier version of the project does not cause a conflict, execution proceeds to block 305; otherwise, execution of method 300 terminates.

At block 305, a datum is added in code review system 120 indicating that the patch is applicable to the earlier version, as in block 206 of method 200. At block 306, an indication that the patch has been applied to the earlier version is received from code review system 120, as in block 207 of method 200. At block 307, a message is generated that identifies the patch and the earlier version, and indicates that the patch has been successfully applied to the earlier version. After block 308, the message is sent to at least one participant of the project (e.g., a maintainer of the project, an author of the patch, a person who discovers the error, etc.)

Figure 4:
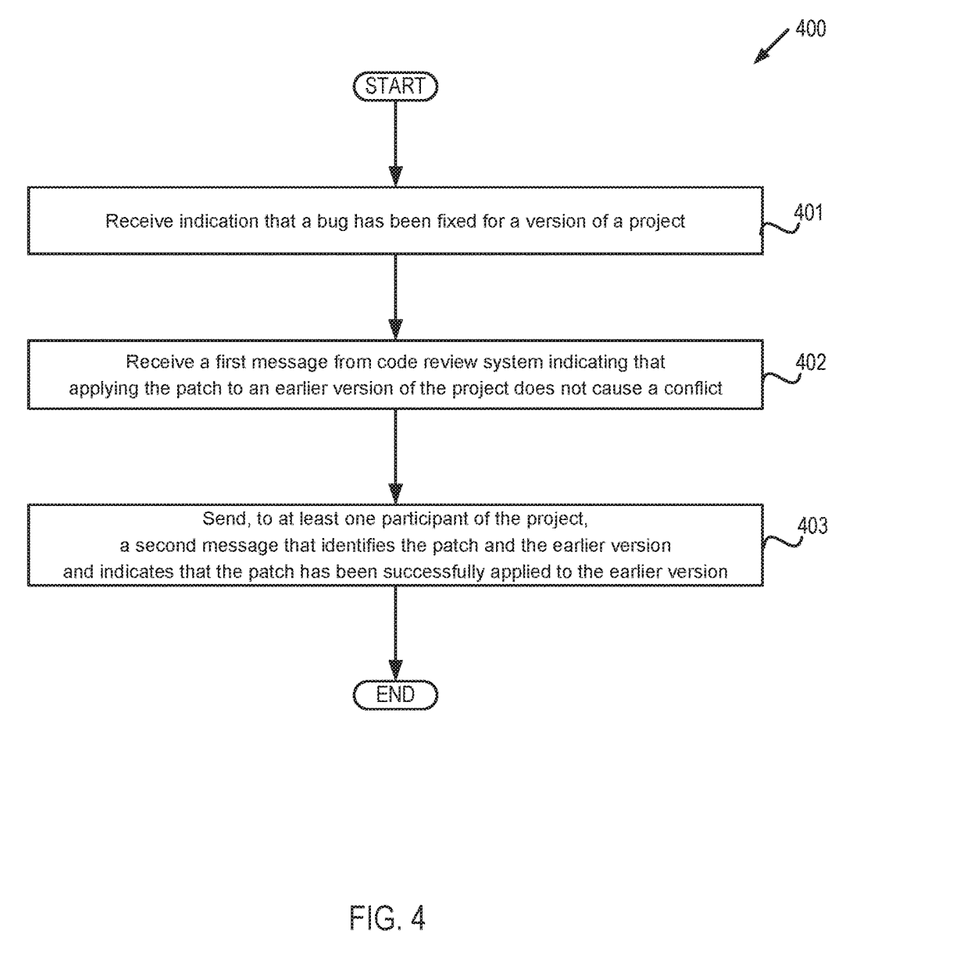
FIG. 4 depicts a flow diagram of another example of a method for backporting bug patches to earlier versions of a project, in accordance with one or more aspects of the present disclosure.

FIG. 4 depicts a flow diagram of another example of a method 400 for backporting bug patches to earlier versions of a project, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 400 is performed by server machine 110 of FIG. 1, and one or more blocks of the method may be performed by backport manager 125 of code review system 120. It should be noted that in some implementations blocks depicted in FIG. 4 may be performed simultaneously or in a different order than that depicted.

At block 401, an indication is received that an error has been fixed for a version of a project, as in block 201 of method 200 and block 301 of method 300. At block 402, a first message is received from code review system 120 indicating that applying the patch to an earlier version of the project does not cause a conflict. In one implementation, the first message is received by backport manager 125.

At block 403, a second message that identifies the patch and the earlier version and indicates that the patch has been successfully applied to the earlier version is sent to at least one participant of the project (e.g., a maintainer of the project, an author of the patch, a person who discovers the error, etc.).

Figure 5:
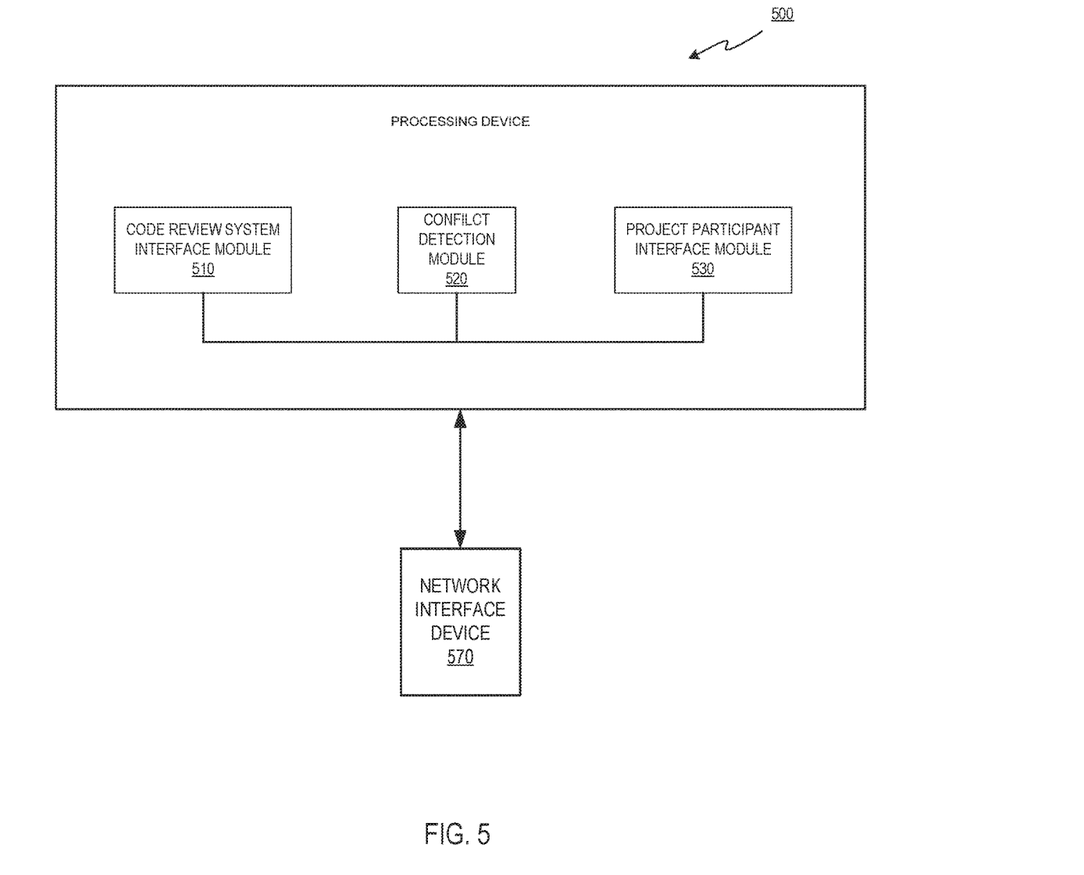
FIG. 5 depicts a block diagram of an illustrative computer system operating in accordance with one or more aspects of the disclosure.

FIG. 5 depicts a block diagram of an illustrative computer system 500 operating in accordance with one or more aspects of the present disclosure. In various illustrative examples, computer system 500 may correspond to a computing device within system architecture 100 of FIG. 1. Computer system 500 comprises a network interface device and a processing device that may include components to enable processing of remote execution requests. In one example, the processing device may include a code review system interface module 510, a conflict detection module 520, and a project participant interface module 530.

In one implementation, code review system interface module 510 receives an indication that an error has been fixed for a version of a project that is managed by a code review system and identifies a patch to fix the error. Conflict detection module 520 determines that backporting of the patch to an earlier version of the project does not cause a conflict. In response to the determination, code review system interface module 510 adds to code review system 120 a datum indicating that the patch is applicable to the earlier version of the project. Project participant interface module 530 receives, from code review system 120, an indication that the patch has been applied to the earlier version of the project; generates a first message that identifies the patch and the earlier version, and indicates that the patch has been successfully applied to the earlier version; and sends, via network interface device 570, the first message to at least one participant of the project.

Figure 6:
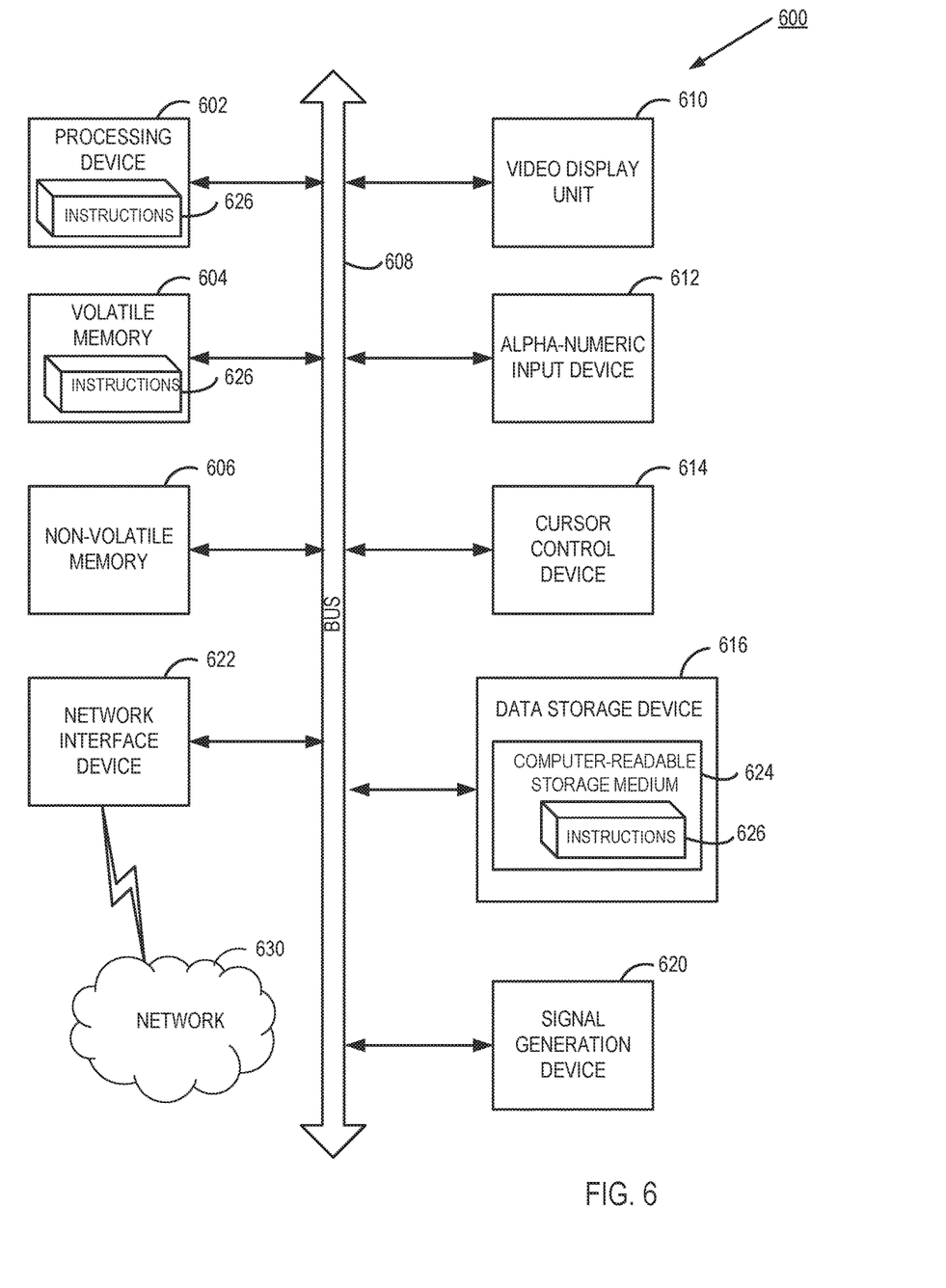
FIG. 6 depicts a block diagram of another illustrative computer system operating in accordance with one or more aspects of the disclosure.

FIG. 6 depicts a block diagram of another illustrative computer system 600 operating in accordance with one or more aspects of the present disclosure. In various illustrative examples, computer system 600 may correspond to a computing device within system architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network 630, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 200, 300, and/or 400 of FIGS. 2 through 4.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "receiving," "identifying," "generating," "sending," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 300, and 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, an indication that an error has been fixed for a version of a project that is managed by a code review system;
   identifying, by the processing device, a patch to fix the error;
   submitting, to the code review system, a query to identify a set of participants associated with the project;
   in response to a determination that backporting of the patch to an earlier version of the project does not cause a conflict:
   adding, to the code review system, a datum indicating that the patch is applicable to the earlier version of the project, receiving, from the code review system, an indication that the patch has been applied to the earlier version of the project, generating a first message that identifies the patch, identifies the earlier version, and indicates that the patch has been successfully applied to the earlier version, and sending the first message to at least one participant of the set of participants; and in response to a determination that backporting of the patch to an earlier version of the project causes a conflict:

generating a second message indicating that the patch is not to be backported to the earlier version, and sending the second message to at least one participant of the set of participants.

2. The method of claim 1 wherein the datum is a tag applied to the error.

3. The method of claim 1 wherein the datum is a tag applied to the patch.

4. The method of claim 3 wherein the patch comprises a patch file, and wherein the tag is a patch commit message embedded within the patch file.

5. The method of claim 1 wherein the set of participants comprises a maintainer of the project.

6. The method of claim 1 wherein the set of participants comprises an author of the patch.

7. The method of claim 1 wherein the set of participants comprises a person who discovered the error.

8. An apparatus comprising:

a network interface device; and a processing device, operatively coupled to the network interface device, to:

receive an indication that an error has been fixed for a version of a project that is managed by a code review system;

identify a patch to fix the error;

in response to a determination that backporting of the patch to an earlier version of the project does not cause a conflict:

add, to the code review system, a datum indicating that the patch is applicable to the earlier version of the project, receive, from the code review system, an indication that the patch has been applied to the earlier version of the project, generate a first message that identifies the patch, identifies the earlier version, and indicates that the patch has been successfully applied to the earlier version, and send, via the network interface device, the first message to at least one participant of the project.

9. The apparatus of claim 8 wherein the datum is a tag applied to the error.

10. The apparatus of claim 8 wherein the datum is a tag applied to the patch.

11. The apparatus of claim 10 wherein the patch comprises a patch file, and wherein the tag is a patch commit message embedded within the patch file.

12. The apparatus of claim 8 wherein the processing device is further to:

in response to a determination that backporting of the patch to an earlier version of the project causes a conflict:

generate a second message indicating that the patch cannot be backported to the earlier version, and send the second message to at least one participant of the project.

13. The apparatus of claim 8 wherein the at least one participant comprises a maintainer of the project.

14. The apparatus of claim 8 wherein the at least one participant comprises a person who discovered the error.

15. A non-transitory computer-readable storage medium comprising instructions that, when executed by a processing device, cause the processing device to:

receive, by the processing device, an indication that an error has been fixed for a version of a project that is managed by a code review system;

receive, from a code review system that manages the project, a first message indicating that applying the patch to an earlier version of the project does not cause a conflict, and send, to at least one participant of the project, a second message that identifies the patch, identifies the earlier version, and indicates that the patch has been successfully applied to the earlier version.

16. The non-transitory computer-readable storage medium of claim 15 wherein the instructions further cause the processing device to add to the code review system a datum indicating that the patch is applicable to the earlier version of the project.

17. The non-transitory computer-readable storage medium of claim 16 wherein the datum is a tag applied to the error.

18. The non-transitory computer-readable storage medium of claim 16 wherein the datum is a tag applied to the patch.

19. The non-transitory computer-readable storage medium of claim 18 wherein the patch comprises a patch file, and wherein the tag is a patch commit message embedded within the patch file.

20. The non-transitory computer-readable storage medium of claim 16 wherein the at least one participant comprises an author of the patch.

* * * * *